US010020720B2

(12) United States Patent
Diehl et al.

(10) Patent No.: US 10,020,720 B2
(45) Date of Patent: Jul. 10, 2018

(54) LATCHING DEVICES

(71) Applicant: EDDY CURRENT LIMITED PARTNERSHIP, Wellington (NZ)

(72) Inventors: Andrew Karl Diehl, Wellington (NZ); Christopher James Allington, Wellington (NZ); Kevin Andrew Wright, Wellington (NZ)

(73) Assignee: EDDY CURRENT LIMITED PARTNERSHIP, Wellington (NZ)

(*) Notice: Subject to any disclaimer, the term of this patent is extended or adjusted under 35 U.S.C. 154(b) by 0 days.

(21) Appl. No.: 15/504,637

(22) PCT Filed: Aug. 18, 2015

(86) PCT No.: PCT/NZ2015/050115
§ 371 (c)(1),
(2) Date: Feb. 16, 2017

(87) PCT Pub. No.: WO2016/028170
PCT Pub. Date: Feb. 25, 2016

(65) Prior Publication Data
US 2017/0244313 A1 Aug. 24, 2017

(30) Foreign Application Priority Data
Aug. 18, 2014 (NZ) .................................. 627619

(51) Int. Cl.
H02K 49/00 (2006.01)
H02K 49/04 (2006.01)
(Continued)

(52) U.S. Cl.
CPC ............. H02K 49/04 (2013.01); A63G 21/22 (2013.01); B60L 7/28 (2013.01); B60L 15/2054 (2013.01);
(Continued)

(58) Field of Classification Search
CPC ....... H02K 49/04; B60R 22/343; B60T 1/005; B60T 1/00; B60L 7/28; B60L 15/2054;
(Continued)

(56) References Cited

U.S. PATENT DOCUMENTS 2,058,024 A 10/1936 Logan, Jr.
2,122,312 A 6/1938 Cassion
(Continued)

FOREIGN PATENT DOCUMENTS

CN 202203305 U 4/2012
CN 102497085 A 6/2012
(Continued)

OTHER PUBLICATIONS

International Search Report and Written Opinion, dated Apr. 1, 2016, for International Application No. PCT/NZ2015/050206, 9 pages.
(Continued)

Primary Examiner — Naishadh Desai
(74) Attorney, Agent, or Firm — Seed IP Law Group LLP

(57) ABSTRACT

Described herein are latching devices where relative speed of movement between members is in part controlled or reduced via eddy current formation and in part controlled or relative motion stopped via a latch arrangement. Various embodiments are described, one being use of a conductive member; at least one magnetic field and a latch member that, prior to latching, moves independently to the at least one conductive member. A kinematic relationship exists between the conductive member and at least one magnetic field that enables the conductive member to move at a different speed relative to the magnetic field on application of an energizing force, thereby inducing an eddy current drag force by relative movement of the conductive member in the magnetic field. The eddy current drag force resulting causes
(Continued)

movement of the conductive member causing the conductive member to engage the latch member thereby halting movement between the at least one conductive member and the at least one latch member.

44 Claims, 6 Drawing Sheets

(51) Int. Cl.
| | |
|---|---|
| *B60L 7/28* | (2006.01) |
| *B60L 15/20* | (2006.01) |
| *A63G 21/22* | (2006.01) |
| *B60R 22/343* | (2006.01) |
| *B60T 1/00* | (2006.01) |

(52) U.S. Cl.
CPC ............ *B60R 22/343* (2013.01); *B60T 1/005* (2013.01); *B60L 2240/507* (2013.01); *Y02T 10/641* (2013.01); *Y02T 10/645* (2013.01); *Y02T 10/72* (2013.01); *Y02T 10/7275* (2013.01)

(58) Field of Classification Search
CPC . B60L 2240/507; A63G 21/22; Y02T 10/641; Y02T 10/645; Y02T 10/7275; Y02T 10/72
USPC ................................................ 310/89, 92, 93
See application file for complete search history.

(56) References Cited

U.S. PATENT DOCUMENTS

| | | | |
|---|---|---|---|
| 2,122,315 A | 6/1938 | Fosty et al. | |
| 2,409,009 A | 10/1946 | Bakke | |
| 2,428,104 A | 9/1947 | Winther | |
| 2,492,776 A | 12/1949 | Winther | |
| 2,771,171 A | 11/1956 | Schultz | |
| 3,364,795 A | 1/1968 | De Coye De Castelet | |
| 3,447,006 A | 5/1969 | Bair | |
| 3,721,394 A | 3/1973 | Reiser | |
| 3,962,595 A | 6/1976 | Eddens | |
| 3,967,794 A * | 7/1976 | Fohl ..................... B60R 22/343 |
| | | | 242/383.3 |
| 4,078,719 A | 3/1978 | Durland et al. | |
| 4,093,186 A | 6/1978 | Golden | |
| 4,224,545 A | 9/1980 | Powell | |
| 4,271,944 A | 6/1981 | Hanson | |
| 4,306,688 A | 12/1981 | Hechler, IV | |
| 4,416,430 A | 11/1983 | Totten | |
| 4,434,971 A | 3/1984 | Cordrey | |
| 4,544,111 A | 10/1985 | Nakajima | |
| 4,561,605 A | 12/1985 | Nakajima | |
| 4,567,963 A * | 2/1986 | Sugimoto ................ A62B 1/08 |
| | | | 182/231 |
| 4,612,469 A | 9/1986 | Muramatsu | |
| 4,690,066 A | 9/1987 | Morishita et al. | |
| 4,938,435 A | 7/1990 | Varner et al. | |
| 4,957,644 A | 9/1990 | Price et al. | |
| 5,054,587 A | 10/1991 | Matsui et al. | |
| 5,064,029 A | 11/1991 | Araki et al. | |
| 5,205,386 A | 4/1993 | Goodman et al. | |
| 5,342,000 A | 8/1994 | Berges et al. | |
| 5,441,137 A | 8/1995 | Organek et al. | |
| 5,465,815 A | 11/1995 | Ikegami | |
| 5,636,804 A | 6/1997 | Jeung | |
| 5,692,693 A | 12/1997 | Yamaguchi | |
| 5,711,404 A * | 1/1998 | Lee ..................... A63B 21/0051 |
| | | | 188/158 |
| 5,712,520 A | 1/1998 | Lamb | |
| 5,722,612 A | 3/1998 | Feathers | |
| 5,742,986 A * | 4/1998 | Corrion ................. B60R 22/48 |
| | | | 180/268 |
| 5,779,178 A * | 7/1998 | McCarty ............... B60R 22/343 |
| | | | 242/384 |
| 5,791,584 A | 8/1998 | Kuroiwa | |
| 5,822,874 A * | 10/1998 | Nemes ..................... B44D 3/38 |
| | | | 33/413 |
| 5,862,891 A | 1/1999 | Kröger et al. | |
| 5,928,300 A | 7/1999 | Rogers et al. | |
| 6,041,897 A | 3/2000 | Saumweber et al. | |
| 6,042,517 A | 3/2000 | Gunther et al. | |
| 6,051,897 A | 4/2000 | Wissler et al. | |
| 6,062,350 A | 5/2000 | Spieldiener et al. | |
| 6,086,005 A | 7/2000 | Kobayashi et al. | |
| 6,279,682 B1 | 8/2001 | Feathers | |
| 6,293,376 B1 | 9/2001 | Pribonic | |
| 6,412,611 B1 | 7/2002 | Pribonic | |
| 6,460,828 B1 * | 10/2002 | Gersemsky .......... A61G 7/1042 |
| | | | 188/164 |
| 6,523,650 B1 | 2/2003 | Pribonic et al. | |
| 6,533,083 B1 | 3/2003 | Pribonic et al. | |
| 6,557,673 B1 | 5/2003 | Desta et al. | |
| 6,561,451 B1 | 5/2003 | Steinich | |
| 6,659,237 B1 | 12/2003 | Pribonic | |
| 6,756,870 B2 | 6/2004 | Kuwahara | |
| 6,793,203 B2 | 9/2004 | Heinrichs et al. | |
| 6,810,997 B2 | 11/2004 | Schreiber et al. | |
| 6,918,469 B1 | 7/2005 | Pribonic et al. | |
| 6,962,235 B2 | 11/2005 | Leon | |
| 6,973,999 B2 | 12/2005 | Ikuta et al. | |
| 7,011,607 B2 | 3/2006 | Kolda et al. | |
| 7,014,026 B2 | 3/2006 | Drussel et al. | |
| 7,018,324 B1 | 3/2006 | Lin | |
| 7,279,055 B2 | 10/2007 | Schuler | |
| 7,281,612 B2 * | 10/2007 | Hsieh ....................... E06B 9/82 |
| | | | 188/156 |
| 7,513,334 B2 | 4/2009 | Calver | |
| 7,528,514 B2 | 5/2009 | Cruz et al. | |
| 7,984,796 B2 | 7/2011 | Pribonic | |
| 8,272,476 B2 | 9/2012 | Hartman et al. | |
| 8,424,460 B2 | 4/2013 | Lerner et al. | |
| 8,490,751 B2 | 7/2013 | Allington et al. | |
| 8,511,434 B2 | 8/2013 | Blomberg | |
| 8,556,234 B2 | 10/2013 | Hartman et al. | |
| 8,567,561 B2 | 10/2013 | Strasser et al. | |
| 8,601,951 B2 | 12/2013 | Lerner | |
| 8,851,235 B2 | 10/2014 | Allington et al. | |
| 9,016,435 B2 | 4/2015 | Allington et al. | |
| 9,199,103 B2 | 12/2015 | Hetrich et al. | |
| 9,242,128 B2 | 1/2016 | Macy | |
| 2002/0162477 A1 | 11/2002 | Palumbo | |
| 2002/0179372 A1 | 12/2002 | Schreiber et al. | |
| 2003/0116391 A1 | 6/2003 | Desta et al. | |
| 2003/0211914 A1 | 11/2003 | Perkins et al. | |
| 2004/0055836 A1 | 3/2004 | Pribonic et al. | |
| 2004/0073346 A1 | 4/2004 | Roelleke | |
| 2004/0168855 A1 | 9/2004 | Leon | |
| 2004/0191401 A1 | 9/2004 | Bytnar et al. | |
| 2005/0117258 A1 | 6/2005 | Ohta et al. | |
| 2005/0189830 A1 | 9/2005 | Corbin, III et al. | |
| 2005/0263356 A1 | 12/2005 | Marzano et al. | |
| 2006/0278478 A1 | 12/2006 | Pribonic et al. | |
| 2007/0000741 A1 | 1/2007 | Pribonic et al. | |
| 2007/0001048 A1 | 1/2007 | Wooster et al. | |
| 2007/0135561 A1 | 7/2007 | Rath et al. | |
| 2007/0228202 A1 | 10/2007 | Scharf et al. | |
| 2007/0228713 A1 | 10/2007 | Takemura | |
| 2007/0256906 A1 | 11/2007 | Jin et al. | |
| 2008/0059028 A1 | 3/2008 | Willerton | |
| 2008/0074223 A1 | 3/2008 | Pribonic | |
| 2008/0087510 A1 | 4/2008 | Pribonic | |
| 2008/0105503 A1 | 5/2008 | Pribonic | |
| 2008/0106420 A1 | 5/2008 | Rohlf | |
| 2008/0135579 A1 * | 6/2008 | Bertram ................ B29B 7/7438 |
| | | | 222/145.5 |
| 2009/0026303 A1 | 1/2009 | Schmitz et al. | |
| 2009/0032785 A1 | 2/2009 | Jones | |
| 2009/0084883 A1 | 4/2009 | Casebolt et al. | |
| 2009/0114892 A1 | 5/2009 | Lesko | |
| 2009/0166459 A1 | 7/2009 | Niitsuma et al. | |
| 2009/0178887 A1 | 7/2009 | Reeves et al. | |

(56) References Cited

U.S. PATENT DOCUMENTS

| | | | |
|---|---|---|---|
| 2009/0211846 A1 | 8/2009 | Taylor | |
| 2010/0032255 A1 | 2/2010 | Conti et al. | |
| 2010/0065373 A1 | 3/2010 | Stone et al. | |
| 2010/0112224 A1 | 5/2010 | Lott | |
| 2010/0116922 A1 | 5/2010 | Choate et al. | |
| 2010/0211239 A1 | 8/2010 | Christensen et al. | |
| 2011/0084158 A1 | 4/2011 | Meillet et al. | |
| 2011/0114907 A1* | 5/2011 | Hartman | A62B 1/08 254/268 |
| 2011/0147125 A1* | 6/2011 | Blomberg | H02K 49/043 182/232 |
| 2011/0174914 A1 | 7/2011 | Yang | |
| 2011/0175473 A1* | 7/2011 | Kitabatake | H02K 7/1025 310/77 |
| 2011/0240403 A1 | 10/2011 | Meillet | |
| 2011/0297778 A1 | 12/2011 | Meillet et al. | |
| 2012/0055740 A1 | 3/2012 | Allington et al. | |
| 2012/0118670 A1 | 5/2012 | Olson et al. | |
| 2012/0312540 A1 | 12/2012 | Lefebvre | |
| 2013/0048422 A1* | 2/2013 | Hartman | A62B 1/08 182/10 |
| 2013/0087433 A1 | 4/2013 | Sejourne | |
| 2013/0118842 A1 | 5/2013 | Lerner | |
| 2013/0186721 A1 | 7/2013 | Bogdanowicz et al. | |
| 2014/0048639 A1 | 2/2014 | Allington et al. | |
| 2014/0110947 A1 | 4/2014 | Mongeau | |
| 2014/0224597 A1 | 8/2014 | Takezawa et al. | |
| 2014/0346909 A1 | 11/2014 | Vogler et al. | |
| 2014/0375158 A1 | 12/2014 | Allington et al. | |
| 2015/0196820 A1 | 7/2015 | Allington et al. | |
| 2015/0266454 A1* | 9/2015 | McGowan | A63G 21/22 104/113 |
| 2015/0352380 A1 | 12/2015 | Huang et al. | |
| 2016/0317936 A1 | 11/2016 | Diehl et al. | |
| 2016/0360738 A1* | 12/2016 | Richardson | A01K 89/003 |
| 2017/0237313 A1 | 8/2017 | Diehl et al. | |
| 2017/0274261 A1 | 9/2017 | Allington et al. | |
| 2017/0328424 A1 | 11/2017 | Allington et al. | |

FOREIGN PATENT DOCUMENTS

| | | | |
|---|---|---|---|
| CN | 102627063 A | 8/2012 | |
| CN | 103244577 A | 8/2013 | |
| DE | 93 00 966 U1 | 3/1993 | |
| DE | 10 2005 032 694 A1 | 1/2007 | |
| EP | 0460494 A1 * | 12/1991 | B60R 22/343 |
| EP | 1 401 087 A1 | 3/2004 | |
| EP | 1 432 101 A1 | 6/2004 | |
| EP | 1 564 868 A1 | 8/2005 | |
| EP | 1 244 565 B1 | 7/2006 | |
| EP | 1 480 320 B1 | 7/2008 | |
| GB | 721748 A | 1/1955 | |
| GB | 908128 A | 10/1962 | |
| GB | 2 352 644 A | 2/2001 | |
| GB | 2 352 645 A | 2/2001 | |
| GB | 2 352 784 A | 2/2001 | |
| GB | 2 357 563 A | 6/2001 | |
| JP | 5-296287 A | 11/1993 | |
| JP | 8-252025 A | 10/1996 | |
| JP | 10-98868 A | 4/1998 | |
| JP | 10-140536 A | 5/1998 | |
| JP | 11-119680 A | 4/1999 | |
| JP | 11-189701 A | 7/1999 | |
| JP | 11-315662 A | 11/1999 | |
| JP | 2000-316272 A | 11/2000 | |
| JP | 2001-17041 A | 1/2001 | |
| WO | 95/16496 A1 | 6/1995 | |
| WO | 96/17149 A1 | 6/1996 | |
| WO | 98/47215 A1 | 10/1998 | |
| WO | 01/38123 A1 | 5/2001 | |
| WO | 03 055560 A1 | 7/2003 | |
| WO | 2008/139127 A1 | 11/2008 | |
| WO | 2009/047469 A1 | 4/2009 | |
| WO | 2009/108040 A1 | 9/2009 | |
| WO | 2009/127142 A1 | 10/2009 | |

OTHER PUBLICATIONS

International Search Report and Written Opinion, dated Feb. 24, 2016, for International Application No. PCT/NZ2015/050207, 10 pages.

International Search Report and Written Opinion, dated Jan. 29, 2016, for International Application No. PCT/NZ2015/050208, 11 pages.

International Search Report and Written Opinion, dated Mar. 11, 2015, for International Application No. PCT/NZ2014/000245, 8 pages.

International Search Report and Written Opinion, dated Mar. 18, 2016, for International Application No. PCT/NZ2015/050209, 14 pages.

International Search Report and Written Opinion, dated Mar. 29, 2016, for International Application No. PCT/NZ2015/050205, 10 pages.

International Search Report and Written Opinion, dated Nov. 11, 2015, for International Application No. PCT/NZ2015/050114, 10 pages.

International Search Report and Written Opinion, dated Nov. 18, 2015, for International Application No. PCT/NZ2015/050113, 9 pages.

International Search Report and Written Opinion, dated Oct. 26, 2015, for International Application No. PCT/NZ2015/050115, 10 pages.

Climbing Wall Descender FP2/5**GDD, Climbing Wall Descent Controllers—Instruction Manual v3. Aug. 18, 2008, 20 pages.

International Search report, dated Feb. 13, 2009, for International Application No. PCT/US2008/087863, 1 page.

International Search Report and Written opinion of the International Searching Authority, dated Feb. 23, 2011, for International Application No. PCT/NZ2010/000011, 10 Pages.

MSA, The Safety Company, Stop Use Notice for Redpoint™ and Auto-Belay Descenders, dated Oct. 15, 2009, retrieved from http://verticalendeavors.com/minneapolis/auto-belay-stop-us-notice/, 2 pages.

TruBlue Auto Belay Operator Manual, Model TB150-12C, 35 pages.

Written Opinion of the International Searching Authority, dated Feb. 13, 2009, for International Application No. PCT/US2008/087863, 14 pages.

Extended European Search Report, dated Jul. 11, 2017, for European Application No. 14872681.3-1809, 10 pages.

Extended European Search Report, dated Mar. 29, 2018, for European Application No. 15834380.6-1201, 12 pages.

* cited by examiner

LATCHING DEVICES

RELATED APPLICATIONS

This application derives priority from New Zealand patent application number 627619 incorporated herein by reference.

BACKGROUND

Technical Field

Described herein are latching devices to control relative speed between members. More specifically, latching devices are described where relative speed of movement of the members are in part controlled or reduced via eddy current formation and in part controlled or relative motion stopped via a latch arrangement.

Description of the Related Art

Eddy current formation may be used in a variety of ways to adjust the speed of rotation of a member. Various apparatus exist, for example in abseiling, to control the descent of a climber or for example, in personal protective equipment scenarios to prevent an injury causing fall. Other applications that use eddy current generation are in controlling pay-out of line in trains, cable cars, zip line devices and roller coasters.

One art device is published as US2012/0055740. This device utilizes a rotor assembly with arms that move relative to the rotor. The arms themselves may be conductive or magnetic or may have conductive or magnetic members attached thereto. When a rotational force is applied to the rotor, the arms move outwards from a central axis via centrifugal force and into a magnetic (or conductive) field. As the arms move through the field, eddy currents are generated, the strength of which is dependent on the speed of rotation. As the speed of rotation reduces, the arms are drawn back towards the axis of rotation via springs and/or a reduced centrifugal force acting on the arms. This device is widely used and provides an excellent means of changing the relative speed of parts, however there is no mechanism to fully stop relative movement of the parts.

Applications where both slowing and completely stopping relative movement may be in a seat belt assembly used in vehicles or, alternatively in industrial personal fall safety devices to slow and halt a fall or a person from a height. Art designs of seat belts for example often use a centrifugal clutch arrangement where, on application of a high rate of extension of the belt or webbing from a spool, a weighted pivoting lever moves outward from the spool and engages a cam piece mounted to the spool housing, thereby jamming the lever against the housing and preventing further release of belt from the spool. This system is widely used and saves many lives, however it has no redundancy—if the lever fails the belt is of no use. Secondly, movement is a sudden stop with no graduated slowing effect leading to injuries at times where the belt passes across the wearer. The seat belt may also engage at times when unwanted such as when the vehicle is stopped or immobile. In an industrial fall safety product often worn for long periods of time, false activations are frustrating and tiring on the wearer. A common problem of these art devices with stopping latches is that there exist only small number of ways to tune the brake response leading to potential false activations.

As may be appreciated, providing a simple means of both slowing and fully stopping relative movement via both eddy current effects and a latch arrangement may be useful or at least it provides the public with a choice.

Further aspects and advantages of the latching devices will become apparent from the ensuing description that is given by way of example only.

BRIEF SUMMARY

Described herein are latching devices where relative speed of movement between members is in part controlled or reduced via eddy current formation and in part controlled or relative motion stopped via a latch arrangement.

In a first aspect there is provided a latching device comprising:

at least one conductive member at least one magnetic field at least one latch member that, prior to latching, moves independently to the at least one conductive member;

a kinematic relationship between the at least one conductive member and at least one magnetic field that enables the at least one conductive member to move at a different speed relative to the at least one magnetic field on application of an energizing force, thereby inducing an eddy current drag force by relative movement of the at least one conductive member in the at least one magnetic field; and wherein the eddy current drag force causes movement of the at least one conductive member about a point or line causing at least part of the at least one conductive member or a member therefrom to engage at least one latch member thereby halting movement between the at least one conductive member and the at least one latch member.

In a second aspect, there is provided a latching device comprising:

at least one magnetic member at least one conductor field at least one latch member that, prior to latching, moves independently to the at least one magnetic member;

a kinematic relationship between the at least one magnetic member and at least one conductor field that enables the at least one magnetic member to move at a different speed relative to the at least one conductor field on application of an energizing force, thereby inducing an eddy current drag force by relative movement of the at least one magnetic member in the at least one conductor field; and wherein the eddy current drag force causes movement of the at least one magnetic member about a point or line causing at least part of the at least one magnetic member or a member therefrom to engage the at least one latch member thereby halting movement between the at least one magnetic member and the at least one latch member.

In a third aspect, there is provided a line dispensing device incorporating a line for extending and retracting, the line operatively coupled to at least one latching device substantially as described above.

In a fourth aspect, there is provided a passenger seat restraint incorporating webbing for extending and retracting, the webbing operatively coupled to at least one latching device substantially as described above.

In a fifth aspect, there is provided a vehicle incorporating at least one wheel, the wheel operatively coupled to at least one latching device substantially as described above.

In a sixth aspect, there is provided a zip line incorporating at least one latching device substantially as described above.

Numerous other applications of the device may also be possible as further outlined in the description below.

One advantage of the above devices described includes the ability to control relative speed between parts in dual ways causing a slowing effect and a stopping effect. The magnitude of the braking effect may be tuned between extremes of a highly dominant eddy current induced braking effect with a minor latch braking effect through to the opposing extreme of a small eddy current induced brake effect and a strong latch braking effect. The tuning may have the effect of avoiding a sudden stop hence a more graduated stopping effect can be executed. A more graduated release post stopping may also be employed. In addition, by using dual means of controlling relative speed, redundancy exists hence if one control method fails, the other will still take place thereby providing an added layer of safety. Another, further advantage of the above device is the wide range of ability to control and vary the latching response meaning the device is able to be used in a range of different ways and applications and minimizes the likelihood of false activations.

BRIEF DESCRIPTION OF THE SEVERAL VIEWS OF THE DRAWINGS

Further aspects of the latching devices will become apparent from the following description that is given by way of example only and with reference to the accompanying drawings in which.

DETAILED DESCRIPTION

Figure 1:
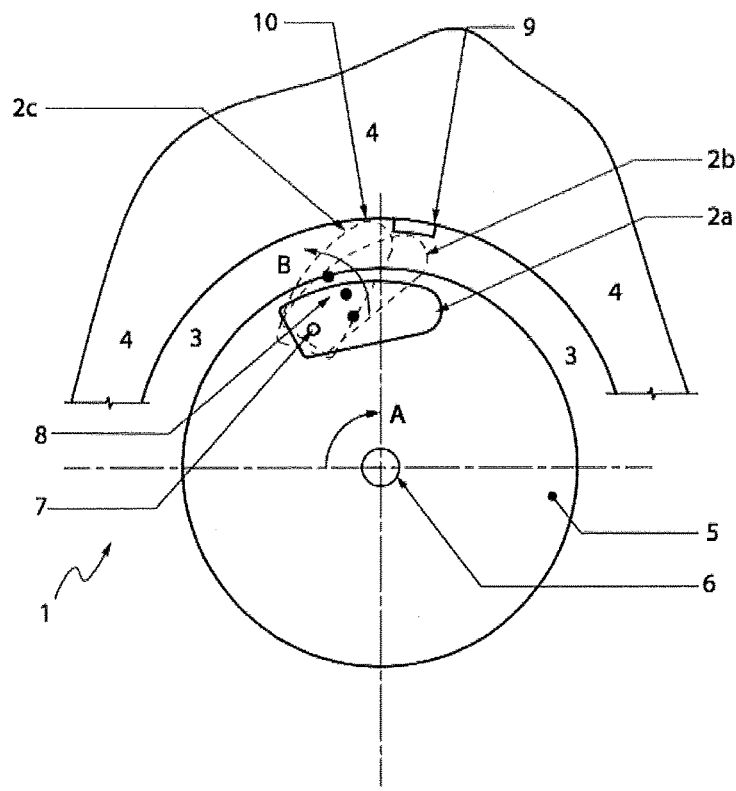
FIG. 1 illustrates a side view of one embodiment of a latching device in three configurations, unbraked (solid lines), eddy current induced braking only (dashed lines), and latched (dotted line)

As noted above, described herein are latching devices where relative speed of movement between members is in part controlled or reduced via eddy current formation and in part controlled or relative motion stopped via a latch arrangement.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e., that it will be taken to mean an inclusion of not only the listed components it directly references, but also other non-specified components or elements.

The term 'energizing force' refers to a force that imposes a rate of movement on an object.

In a first aspect there is provided a latching device comprising:
  at least one conductive member
  at least one magnetic field
  at least one latch member that, prior to latching, moves independently to the at least one conductive member;
  a kinematic relationship between the at least one conductive member and at least one magnetic field that enables the at least one conductive member to move at a different speed relative to the at least one magnetic field on application of an energizing force, thereby inducing an eddy current drag force by relative movement of the at least one conductive member in the at least one magnetic field; and
  wherein the eddy current drag force causes movement of the at least one conductive member about a point or line causing at least part of the at least one conductive member or a member therefrom to engage at least one latch member thereby halting movement between the at least one conductive member and the at least one latch member.

In a second aspect, there is provided a latching device comprising:
  at least one magnetic member
  at least one conductor field
  at least one latch member that, prior to latching, moves independently to the at least one magnetic member;
  a kinematic relationship between the at least one magnetic member and at least one conductor field that enables the at least one magnetic member to move at a different speed relative to the at least one conductor field on application of an energizing force, thereby inducing an eddy current drag force by relative movement of the at least one magnetic member in the at least one conductor field; and
  wherein the eddy current drag force causes movement of the at least one magnetic member about a point or line causing at least part of the at least one magnetic member or a member therefrom to engage the at least one latch member thereby halting movement between the at least one magnetic member and the at least one latch member.

As may be appreciated, the magnetic flux interaction may be swapped where in one embodiment, the conductive member engages with the latch member or instead the magnetic member engages with the latch member. For prolixity and ease of description, the embodiment of a conductive member engaging with a latch member is described however, this should not be seen as limiting as the parts may be swapped as noted above.

When the energizing force is reduced below a pre-determined level, the at least one conductive member may be released from the at least one latch member and relative movement between the at least one conductive member and the at least one latch member may occur. Alternatively, a force may be applied to cause disengagement.

Prior to the energizing force being applied, the at least one conductive member may lie at least partially within the at least one magnetic field.

Prior to the energizing force being applied, the at least one conductive member may lie outside the at least one magnetic field and a further movement input may move the at least one conductive member into the magnetic field. The further movement input may be selected from:

(a) a centrifugal force acting on the at least one conductive member or at least one magnetic field;
(b) an inertial response due to acceleration of the conductive member;
(c) a bias mechanism drawing or forcing the at least one conductive member or at least one magnetic field together;
(d) at least one mechanical driving mechanism driving the at least one conductive member or at least one magnetic field together;
(e) and combinations of the above further movement inputs.

The induced eddy current drag force may cause linear and/or rotational translation of the at least one conductive member about a line or point, inclined or offset respectively from the line of action of the eddy current induced drag force.

The at least one conductive member may move at least partially orthogonally to the direction of movement of the conductive member as defined by the kinematic relationship and/or pivotally relative to the magnetic field on application of the energizing force.

The at least one conductive member and/or at least one magnetic field movement dynamics may be tuned by varying the at least one conductive member or at least one magnetic field: dimensions, weight, center of mass, location on a member, location in a member, whether the conductive forms only part or all of the member; to tune the speed of movement and inertia to movement of the at least one conductive member and/or at least one magnetic field. By way of example, the conductive member may take various shapes or weights, factors that influence the rate of motion of the member. The magnetic field may for example be continuous or spaced apart or of varying dimensions to thereby adjust the flux occurring. The conductive portion of the conductive member may be the whole member or only a portion thereof. Where only a portion of the member is conductive, the location of the conductor portion either on the exterior, interior or part of the member can be altered.

Movement of the conductive member may be direct—that is the conductive member moves directly due to the energizing force. The conductive member may instead move indirectly or by proxy at least in part due to the energizing force causing at least one additional mechanical part or force dynamic to move or interact with the conductive member and thereby subsequently causing motion of the conductive member. Indirect means may be a dynamic force transfer via another part such as a coupling or gear or a centrifugal force being imposed on the conductive member by direct force on another part. Indirect or proxy force transfer may have the advantage of being able to amplify the energizing force thereby altering the magnetic flux interaction.

Static or dynamic positional and/or strength adjustment of the point of action of the eddy current induced force may also be completed by:
(a) adjusting the position of the magnetic element or conductive region on the trigger member as the trigger member or first member moves; and/or,
(b) adjusting the position of the magnetic element or conductive region on the first member as the trigger member or first member moves.

By way of example, the trigger member may comprise a slot and a portion of the trigger member comprising the magnetic element or conductive region moves within the slot as the trigger member as a whole moves on application of the energizing force. This additional means of adjusting movement may be useful to further alter the force dynamics and hence the way the parts interact. For example, in a rotary movement embodiment where the trigger member induces an eddy current drag force on overall system movement, positional adjustment may affect both the eddy current drag force and position which in turn may alter the resisting torque on the trigger member. In a linear movement embodiment, positional adjustment might affect the eddy current force generated.

The at least one conductive member and/or at least one magnetic field movement dynamics may also be tuned by use of at least one of:
(a) a bias mechanism resisting or urging movement of the at least one conductive member and/or at least one magnetic field relative to each other;
(b) a centrifugal input resisting or urging movement of the at least one conductive member and/or at least one magnetic field relative to each other;
(c) at least one mechanical driving mechanism driving the at least one conductive member or at least one magnetic field together.

The at least one conductive member may be attached to a body member that also moves at least partially with the at least one conductive member and, when the at least one conductive member engages with the at least one latch member, movement of the body member may also stop relative to the at least one latch member.

In an alternative embodiment, the conductive member may be attached to a body member that is stationary and the latching member and magnetic field move relative to the conductive member and, when the at least one conductive member engages with the latch member, movement of the latch member stops relative to the body member.

The at least one conductive member may be at least one pawl with movement of the at least one conductive member constrained by:
(a) an axis of rotation;
(b) a line of translation;
(c) a combination of an axis of rotation and a line of translation.

The at least one pawl may be orientated at an inclined plane relative to an orthogonal plane from the direction of motion of the pawl in the at least one magnetic field.

The axis of rotation or line of translation may be attached to the body member.

The body member may be a rotor and the at least one pawl may be rotationally and pivotally mounted on the rotor, the rotor rotating about a rotor axis as the energizing force is applied.

The at least one pawl may be attached to the rotor at a point offset from the rotor axis.

The body member may be a slider and the at least one pawl may be rotationally and pivotally mounted on the slider, wherein the slider translates along a pathway as the energizing force is applied.

At least part of a surface of the at least one conductive member or a part thereof may interface with at least part of a surface of the at least one latch member or a part thereof.

The surfaces may frictionally engage.

One or both surfaces may be shaped to physical restrain the members on engagement.

The at least one conductive member may be retained in an engaged mode with the at least one latch member after the energizing force is removed.

The at least one conductive member may move through a constrained path relative to the at least one magnetic field on application of an energizing force.

The path may be constrained by use of an aperture in the conductive member defining the range of movement and a stop that acts as a latch member that defines one or more distal points of movement.

As noted above there are two braking effects, one from an induced eddy current and the other from engagement of a latch. As may be appreciated, the magnitude of the braking effect may be tuned between extremes of a highly dominant eddy current induced braking effect with a minor latch braking effect through to the opposing extreme of a small eddy current induced brake effect and a strong latch braking effect. By way of example, an auto belay device may incorporate the above described latching device. In this example, the eddy current braking effect may be strongest and the latch brake effect may be secondary, the aim being to initially slow a fall and then stop the fall altogether. In an alternative embodiment, the eddy current brake effect may be very small, but just sufficient to cause a pawl to move and engage the latch member and the latch member then cause the primary braking effect. An example where this embodiment may be used could be in a motor vehicle seat belt.

Relative movement between the first member and at least the third member may be frictionless. Magnetic forces such as the induced force noted above and any subsequent forces acting on the first member may avoid friction contact. This may be useful to minimize mechanical wearing on the parts.

In one embodiment, movement between the parts may be predominantly governed by dynamic forces. The device may be free of liquid fluid with all movement between the parts due to dynamic forces. Alternatively, the device may have some liquid fluid present but the predominant energizing force on the device members may be dynamic force. Liquid based systems utilizing magnetics to alter kinematic relationships exist but these devices differ to that described herein in that that are often bi-stable—that is, the parts are only stable in two positions. In addition, movement predominantly or wholly relies on a force or pressure build up from the liquid fluid as opposed to reliance predominantly on dynamic forces. Liquid based devices also have inherent difficulties associated with sealing the liquid and more regular maintenance being required to ensure reliable running.

In a third aspect, there is provided a line dispensing device incorporating a line for extending and retracting, the line operatively coupled to at least one latching device substantially as described above. Line dispensing devices such as auto belay devices are widely used to prevent falls in both recreational and industrial applications. In some cases, a latch mechanism that halts any further release of line from the auto belay device may be very important.

In a fourth aspect, there is provided a passenger seat restraint incorporating webbing for extending and retracting, the webbing operatively coupled to at least one latching device substantially as described above. One example of a passenger seat restraint may be a seat belt used in a vehicle such as a car. Seat belts are a critical safety feature and the above described device may provide a useful alternative to existing designs particularly given the ability to tune the response in the wide variety of ways noted.

In a fifth aspect, there is provided a vehicle incorporating at least one wheel, the wheel operatively coupled to at least one latching device substantially as described above to halt movement of the vehicle. One example of a vehicle employing the latching device may be a cargo carrier used in mining such as a coal train carriage. The wheels may include the above latching arrangement to prevent unwanted free movement of the carrier such as down a slope.

In a sixth aspect, there is provided a zip line incorporating at least one latching device substantially as described above. In this application, the latch may be useful as an emergency feature to halt excessive movement or to prevent for example, the zip line moving in a reverse orientation.

The above examples should not be seen as limiting since the devices described may be used for a wide variety of other applications, non-limiting examples including speed control of:

a rotor in a rotary turbine;
exercise equipment, e.g., rowing machines, epicyclic trainers;
roller-coasters and other amusement rides;
Elevator and escalator systems;
evacuation descenders and fire escape devices;
conveyer systems:
rotary drives in factory production facilities;
materials handling devices such as conveyer belts or a braking device in a chute;
dynamic display signage to control the rate of change of rotating signs;
roadside safety systems, e.g., the eddy current brake may be connected in a system to provide crash attenuation though the dissipation of energy via the brake;
seat belts in vehicles;
braking mechanisms for trolleys and carriages.

As noted above, one advantage of the above latching mechanism is the ability to control relative speed between parts in two ways causing a slowing effect and stopping effect. This has the effect of avoiding a sudden stop hence a more graduated stopping effect may be executed. In addition, by using two means of controlling relative speed, a degree of redundancy may be incorporated, hence if one control method fails, the other will still take place. A further advantage is the wide range of ways to tune the latching response by altering the kinematic relationship between the parts. The wide range of tuning makes the device useful in a range of applications.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth, Where specific integers are mentioned herein which have known equivalents in the art to which this invention relates, such known equivalents are deemed to be incorporated herein as if individually set forth.

Working Examples

The above described latching devices are now described by reference to specific examples.

For ease of description in the examples, only a single conductive member is typically shown although it should be appreciated that multiple conductive members may be used.

The magnetic field and latching member are generally shown for prolixity as continuous regions. The magnetic field may for example by a series of discrete magnets or even just one magnet. Similarly, the latch member may take on various shapes or surface contours, with only a limited number of examples shown for clarity.

While certain movement, for example of the conductive member may be shown in an example, it should be appreciated that the magnetic field and/or latching member(s) may also move or even the conductive member remain fixed while the magnetic field and/or latching member(s) move. As should be appreciated, it is the relative difference in speed between the conductive member(s) and the magnetic field that is of relevance.

Finally, the conductive member and magnetic field may be reversed in the examples below and the same outcome achieved.

Example 1

As illustrated by the schematic of FIG. 1, the latching device 1 in the embodiment shown comprises a conductive member 2 moving relative to a magnetic field 3, and a latching member 4.

The conductive member 2 as shown is attached to a rotor 5 that acts as a body member. The rotor 5 rotates about an axis 6, in this example in a clockwise direction A. The conductive member 2 may rotate in direction B when subjected to a rotational force from the rotor 5 about a pivot axis 7 eccentric to the rotor axis 6. The conductive member 2 may have a center of mass 8 off set from the pivot axis 7. The latching member 4 may have one or more protrusions 9 that interlink with the conductive member 2. In use, on application of a force such as extending a line (not shown), a rotational force is applied to the rotor 5. As rotational acceleration occurs, an inertial force is applied on the conductive member 2. The energizing force interacts with the inertia of the conductive member 2 and the conductive member 2 pivots about the pivot axis 7 with respect to the rotor 5. Other variants may be used to influence the conductive member 2 movement such as a bias member (not shown) urging movement or retarding movement of the conductive member 2. As shown in FIG. 1, the movement in direction B may be from a point outside the magnetic field 3 shown in line form as item 2A. Movement may then be via rotation about axis 7 with a part of the conductive member 2 moving into the magnetic field 3 to a position 2B marked in dashed lines, this position being a continuum from point 2A to point 2C, the proviso being that at least part of the conductive member 2 is inside the magnetic field 3. When the conductive member 2 enters the magnetic field 3, an eddy current drag effect (not shown) occurs on movement of the conductive member 2 in the magnetic field 3. This drag encourages further pivoting movement of the conductive member 2 with respect to the rotor 5 about the rotation axis 7 until at least a part of the conductive member 2 reaches a position 2C marked in dotted lines that engages the latch 4. Engagement may simply be the two surfaces (part of the conductive member 2 and part of the latch 4) striking each other, and/or via friction, preventing further movement or (as shown), the conductive member 2 edge 10 engages a physical restraint such as a protrusion 9 as shown in FIG. 1. Once engaged, movement of the conductive member 2 is halted relative to the latch member 4. In the embodiment of the latch device 1 shown, engagement of the conductive member 2 with the latch member 4 also halts movement of the body member or rotor 5. If for example a line were coupled to the rotor 5, pay out of line would halt as the conductive member 2 and latching member 4 engage. In the embodiment shown, disengagement of the latch 4 could occur by removing or reducing the rotational force on the rotor 5 to allow the conductive member 2 to return to a starting position 2A. Alternatively, the latch member 4 and conductive member 2 may remain engaged, for example via friction and/or via opposite polarity magnets (not shown) and/or mechanical interlocking until an urging force is applied to separate the parts 2, 4.

The above kinematic relationship between the parts 2, 4 may be altered.

For example, the conductive member 2 may lie in a neutral position, already at least partly within 2B the magnetic field 3. Alternatively, the center of mass 8 of the conductive member 2 may be at a point offset from the conductive member 2 pivot axis 7 thereby creating a greater turning moment on the conductive member 2 about the pivot axis 7 particularly as the eddy current drag impinges on the center of mass 8.

The kinematic relationship may also be altered by varying the conductive member 2 or magnetic field 3 dimensions, weight and center of mass to tune the speed of movement and inertia to movement of the conductive member 2 and/or magnetic field 3.

Example 2

Figure 2:
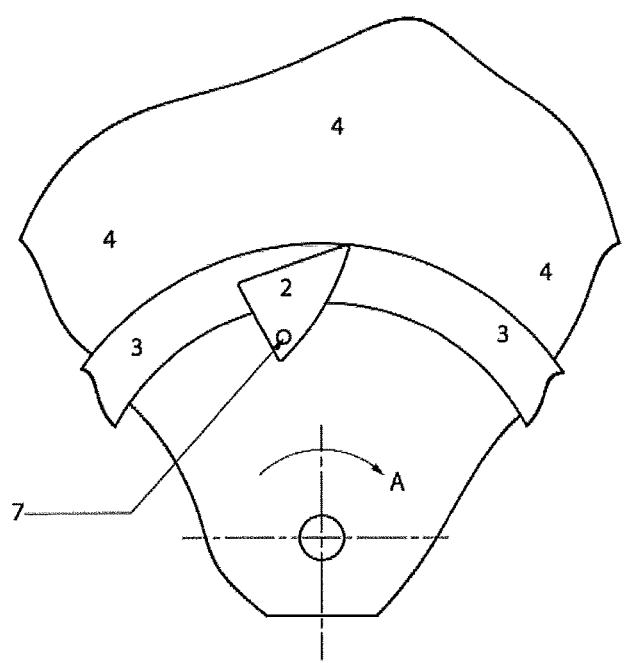
FIG. 2 illustrates a side view of an alternate embodiment incorporating a rotating body member and a pivoting pawl.

As shown in FIG. 2, the conductive member 2 may take on various shapes to suit the desired movement dynamics and the conductive member 2 may be mounted in positions that also alter the movement dynamics. In the embodiment shown in FIG. 2, the conductive member 2 still rotates about an axis 7 however, in the embodiment shown, the conductive member 2 is already part way into the magnetic field 3 no matter what position the conductive member 2 is relative to the pivot axis 7 due to the shape of the member 2 and the position of the pivot axis 7.

Example 3

Figure 3:
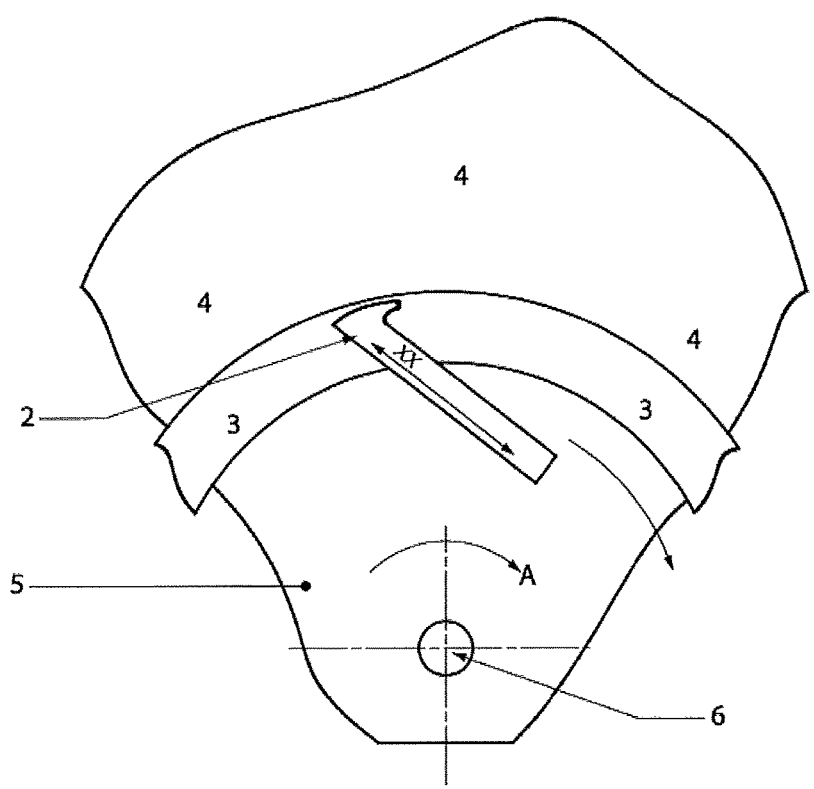
FIG. 3 illustrates a side view of an alternate embodiment incorporating a rotating body member and a sliding pawl.

FIG. 3 shows a further embodiment where the conductive member 2 takes the form of a rod, the rod 2 translating into or out of an aperture (not shown) in the body member 5 along line of translation marked XX. Rotation of the body member 5 about axis A causes translation of the rod 2 out of the aperture and one end of the rod 2 may strike and engage with the latch member 4. This example again illustrates how the conductive member 2 may take on different shapes and forms and movement of the conductive member 2 may be via an axis of rotation as in Examples 1 and 2 or translation as in this example.

Example 4

Figure 4:
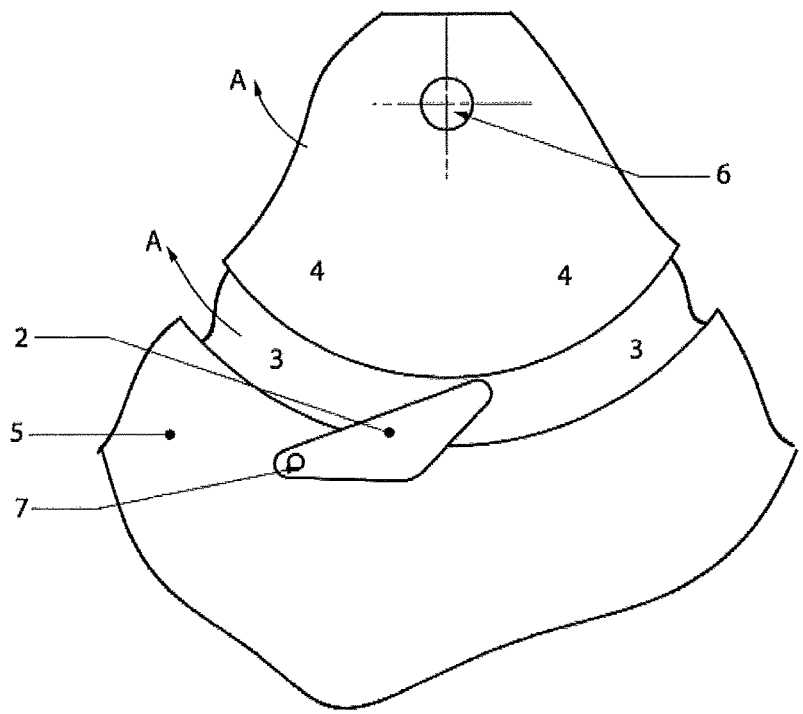
FIG. 4 illustrates a side view of an alternate embodiment incorporating a rotating body member and a pivoting pawl.

FIG. 4 illustrates a further embodiment of the latch device 1. In this embodiment, the body member 5 and conductive member 2 lie on the outside circumference of a rotating magnetic field 3 and latch member 4, the axis of rotation being item 6 and the direction of movement being in a clockwise direction. The conductive member 2 on application of an energizing force moves about a rotation axis 7 with at least part of the conductive member 2 moving into the magnetic field 3 wherein an eddy current drag force (not shown) is induced urging rotation of the conductive member 2 until the member 2 engages with the latch member 4 halting relative rotation of the latch member 4 and magnetic field 3.

Example 5

Figure 5:
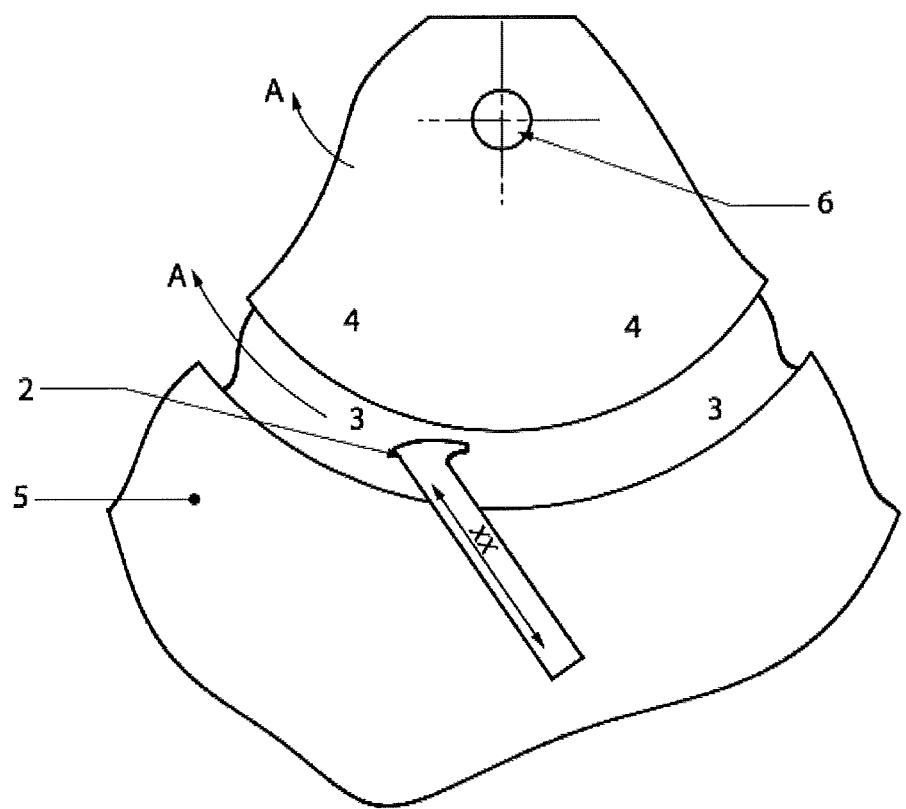
FIG. 5 illustrates a side view of an alternate embodiment incorporating a rotating body member and a sliding pawl.

As illustrated in FIG. 5, the same principle shown in FIG. 4 can be applied using the rod 5 first discussed in Example 3 above. In this example, the body member 5 and rod 2 are fixed in position on a part of the circumference of the device 1 and the magnetic field 3 and latch member 4 rotate about axis 6 in direction A. It should be noted that the rod 2 is off set in a direction inclined relative to the direction of rotation so as to allow translational movement of the rod 2 out of (and back into) the body member 5.

Example 6

Figure 6:
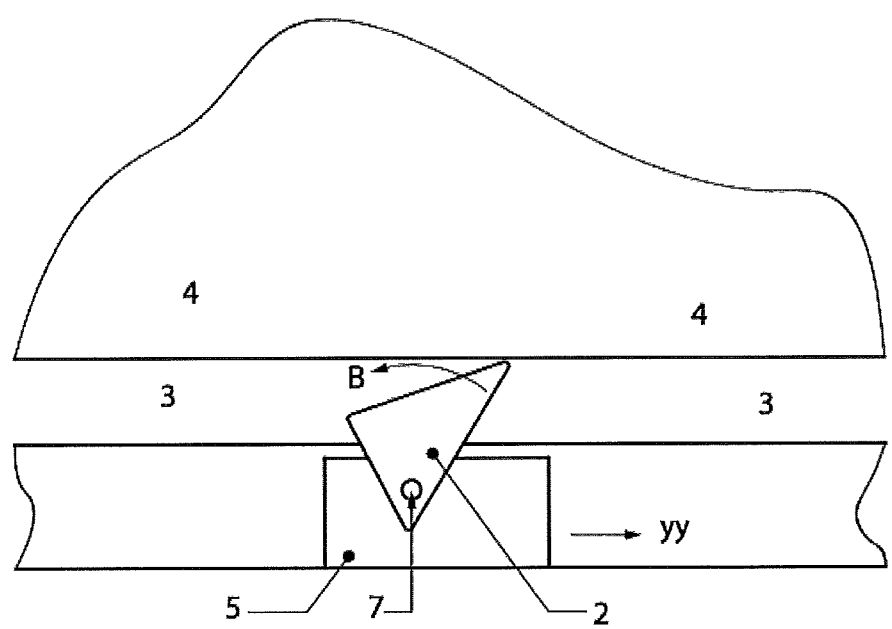
FIG. 6 illustrates a side view of an alternate embodiment incorporating a sliding body member and a pivoting pawl.

Referring to FIG. 6 an alternative embodiment is shown where linear motion is used as opposed to rotational motion illustrated in the above Examples.

The body member 5 moves along a plane in direction YY. A conductive member 2 in this case shown as a pawl with one end attached to a pivot axis 7 is fastened to the body member 5. When the body member 5 moves in a linear direction YY, the conductive member 2 moves into the magnetic field 3 and is urged via eddy current drag forces to rotate about the axis 7 until the conductive member 2 or a part there of strikes and engages the latch member 4 thereby arresting further movement of the body member 5 and conductive member 2 relative to the latch member 4.

Example 7

Figure 7:
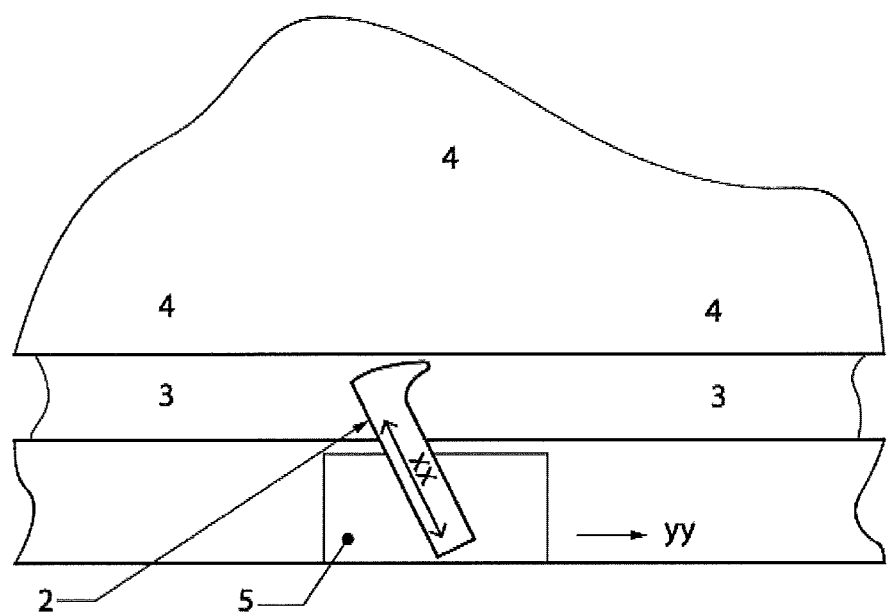
FIG. 7 illustrates a side view of an alternate embodiment incorporating a sliding body member and a sliding pawl.

FIG. 7 shows a similar embodiment to that of Example 6, this time using a rod as the conductive member 2 that translates via line XX instead of rotating about an axis. As the body member 5 moves in a linear direction YY, the rod 2 is drawn out of the body member 5 due to the eddy current induced drag force due to movement of the rod 2 in the magnetic field 3 until the rod engages with the latch member 4.

Example 8

Figure 8:
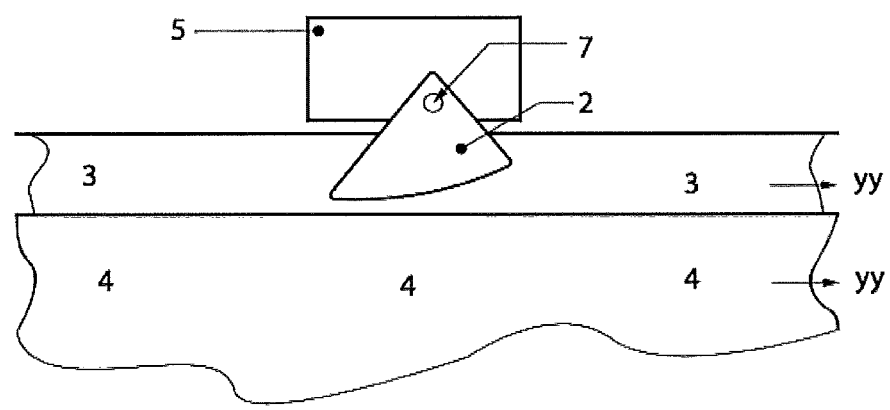
FIG. 8 illustrates a side view of an alternate embodiment incorporating a sliding body member and a pivoting pawl.

FIG. 8 shows an embodiment similar to that described in Example 6 however, in FIG. 8, the magnetic field 3 and latch members 4 move in linear direction YY and the pawl shaped conductive member 2 and body member 5 remain stationary relative to the direction YY movement. The movement of the magnetic field 3 urges movement of the conductive member 2 about axis 7 until the conductive member 2 engages the latch member 4 at which point relative movement is halted.

Example 9

Figure 9:
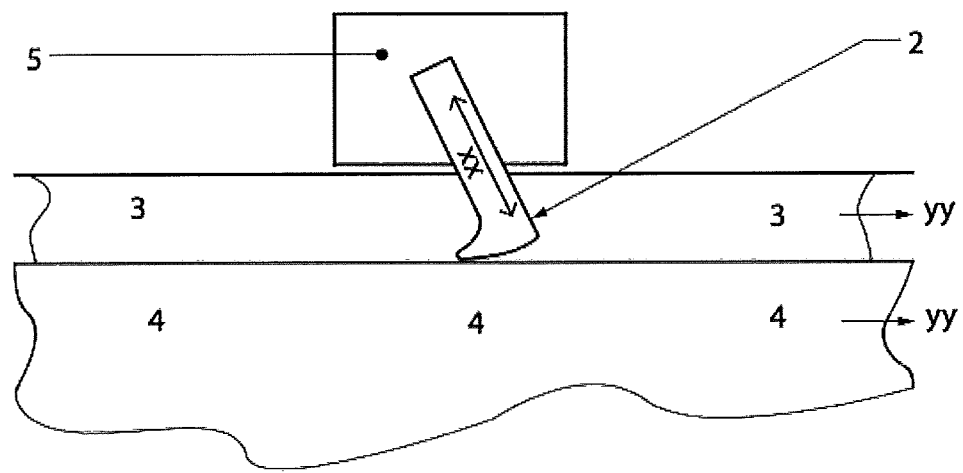
FIG. 9 illustrates a side view of an alternate embodiment incorporating a sliding body member and a sliding pawl.

FIG. 9 shows the embodiment of Example 8 however this time using a rod shaped conductive member 2 described in earlier Examples. As should be appreciated, the conductive member 2 shape can also be altered in this scenario of fix body member 5 and moving magnetic field 3 and latch member 4.

Example 10

Figure 10:
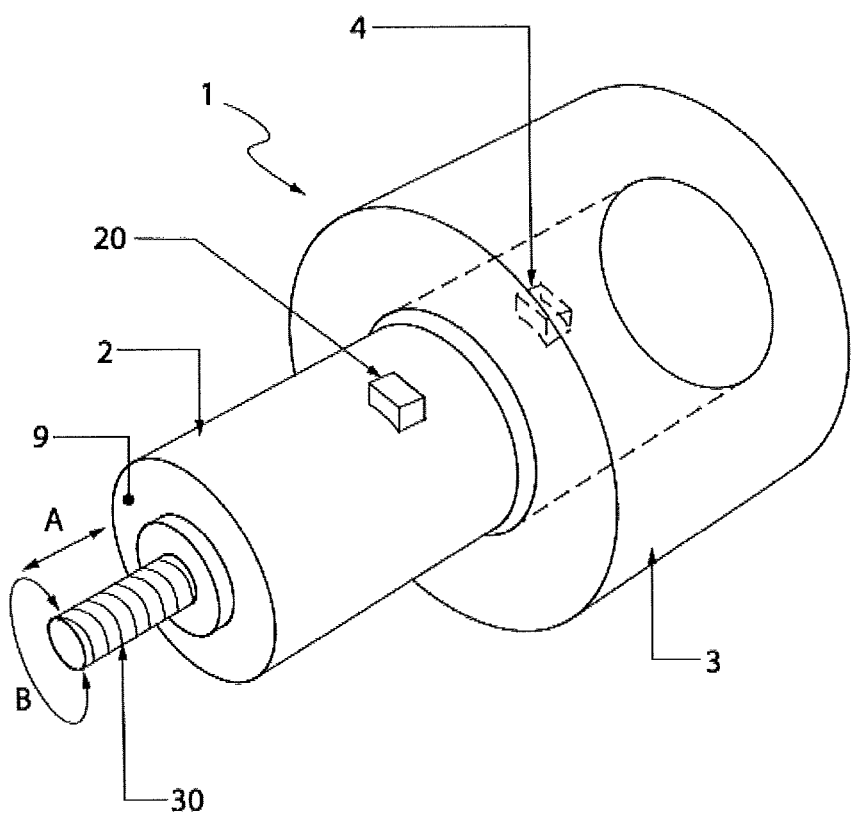
FIG. 10 illustrates a perspective view of an alternative embodiment incorporating a tube that rotates and translates into a cylinder.

FIG. 10 illustrates a yet further variation of the latch device 1. In this example, the conductive member 2 is formed as a tube. The tube 2 may move rotationally about direction B and translate in a linear direction A along the axis of rotation. The tube 2 may be moved via translation direction A, into a magnet or magnetized cylinder 3. Relative variation in movement between the tube 2 and cylinder 3 induces an eddy current drag that slows rotation of the tube 2 relative to the magnetized cylinder 3 until a pawl 20 engages a latch 4, in this example being a mating indentation inside the cylinder 3 that the pawl 20 interlocks with. Translational movement of the tube 2 may be urged via a driving mechanism such as a threaded shaft 30.

Example 11

Figure 11:
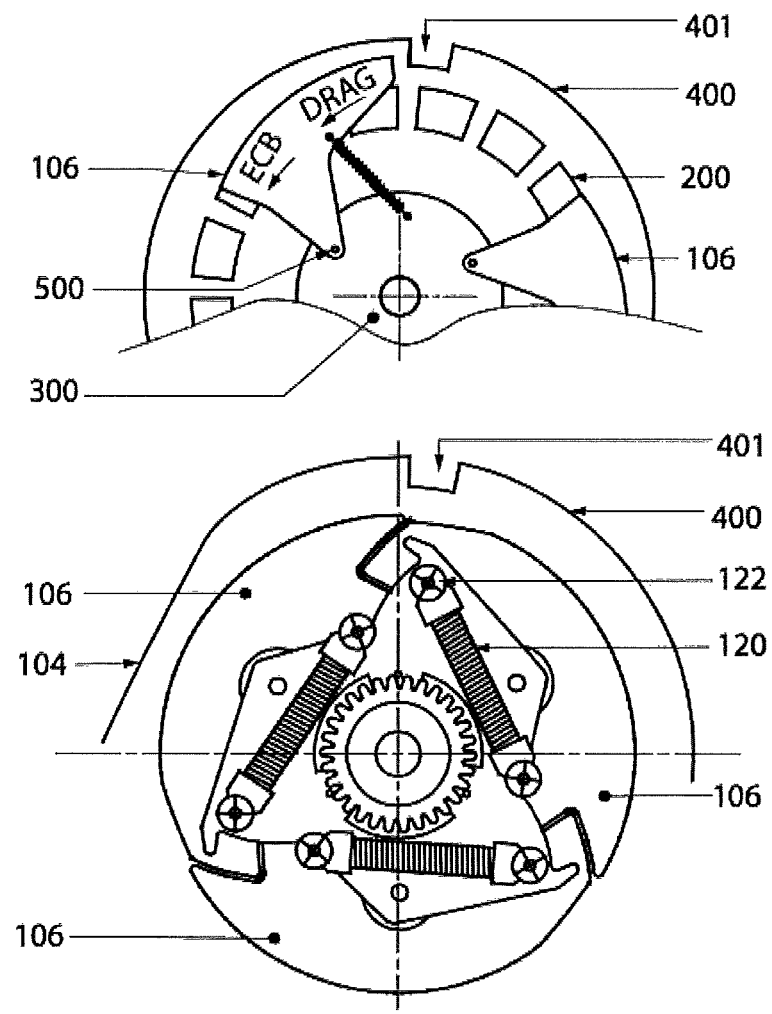
FIG. 11 illustrates a side view schematic of a specific embodiment useful for line dispensing devices.

FIG. 11 shows a further variation, this time using springs 120 to help tune the dynamics of movement of the conductive members 106. The device 1 includes in this example three conductive members bias towards a contracted position about the rotor 300 axis of rotation. The conductive members have pivot axes 500 about which they move on application of a rotational force about the rotor axis. Outward motion of the conductive members 106 brings them into a magnetic field region 200, the magnetic field 200 being generated from a series of magnets 200 around the circumference of the area in which the conductive members 106 pass. At a pre-determined point, the conductive member or members 106 engage a latch mechanism 400, in the example shown being a protrusion 401 that engages with one side of the conductive member or members 106. This particular embodiment may be useful in a fall protection device where the rotor 300 may be linked to a spool and line. Under normal use, the wearer can draw line from the spool as the extending force on the line is insufficient to overcome the bias of the springs 120. In the event of a fall or sudden line extension, the transferred rotation on the rotor axis 300 causes the conductive member 106 to overcome the bias and extend out until engaged by the latch member(s) 400. On engagement, the fall may be arrested by preventing further pay-out of line from the spool thus halting the fall of the wearer. By tuning the speed with which the latch member or members 400 are engaged, false activations can be avoided. In addition, the eddy current induced drag can be used the slow the pay-out prior to a complete halt thereby cushioning the brake effect.

Aspects of the latching devices have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A latching device comprising:
 at least one conductive member;
 at least one magnetic field;
 at least one latch member that, prior to latching, moves independently to the at least one conductive member;
 a kinematic relationship between the at least one conductive member and at least one magnetic field that enables the at least one conductive member to move at a different speed relative to the at least one magnetic field on application of an energizing force, thereby inducing an eddy current drag force by relative movement of the at least one conductive member in the at least one magnetic field;
 wherein the eddy current drag force causes movement of the at least one conductive member about a point or line causing at least part of the at least one conductive member or a member therefrom to engage the at least one latch member thereby halting movement between the at least one conductive member and the at least one latch member; and wherein either:
  the at least one conductive member is attached to a body member that moves at least partially with the at least one conductive member and, when the at least one conductive member engages with the at least one latch member, movement of the body member stops relative to the at least one latch member; or
  the conductive member is attached to a body member that is stationary and the latching member and magnetic field move relative to the conductive member and when the at least one conductive member engages with the latch member, movement of the latch member stops relative to the body member.

2. The latching device as claimed in claim 1 wherein, when the energizing force is below a pre-determined level, the at least one conductive member is released from the at least one latch member and relative movement between the at least one conductive member and the at least one latch member can occur.

3. The latching device as claimed in claim 1, wherein prior to the energizing force being applied, the at least one conductive member lies at least partially within the at least one magnetic field.

4. The latching device as claimed in claim 1, wherein prior to the energizing force being applied, the at least one conductive member lies outside the at least one magnetic field and a further movement input moves the at least one conductive member into the magnetic field.

5. The latching device as claimed in claim 4 wherein the further movement input is selected from:
  a centrifugal force acting on the at least one conductive member or at least one magnetic field;
  an inertial response due to acceleration of the conductive member;
  a bias mechanism drawing or forcing the at least one conductive member or at least one magnetic field together;
  at least one mechanical driving mechanism driving the at least one conductive member or at least one magnetic field together;
  and combinations of the above further movement inputs.

6. The latching device as claimed in claim 1 wherein the induced eddy current drag force causes linear and/or rotational translation of the at least one conductive member about a line or point, inclined or offset respectively from a line of action of the eddy current induced drag force.

7. The latching device as claimed in claim 1 wherein the at least one conductive member moves at least partially orthogonally to the direction of movement of the conductive member as defined by the kinematic relationship and/or pivotally relative to the magnetic field on application of the energizing force.

8. The latching device as claimed in claim 1 wherein movement dynamics of the at least one conductive member and/or at least one magnetic field are tuned to tune the speed of movement and inertia to movement of the at least one conductive member and/or at least one magnetic field by varying one or more of: dimensions of the conductive member or the magnetic field, weight of the conductive member, center of mass of the conductive member, location of the conductive member or the magnetic field on another member, location of the conductive member or the magnetic field within another member, and whether a conductive material forms only a part or all of the conductive member.

9. The latching device as claimed in claim 1 wherein the conductive member moves directly due to the energizing force.

10. The latching device as claimed in claim 1 wherein the conductive member moves indirectly at least in part due to the energizing force causing at least one additional mechanical part or force dynamic to move or interact with the conductive member and thereby subsequently causing motion of the conductive member.

11. The latching device as claimed in claim 1 wherein static or dynamic positional and/or strength adjustment of a point of action of the eddy current induced force is completed by adjusting the position of the conductive region on the conductive member as the conductive member or magnetic field moves.

12. The device as claimed in claim 1 wherein movement between the members is predominantly governed by dynamic forces.

13. The latching device as claimed in claim 1 wherein the at least one conductive member and/or at least one magnetic field movement dynamics are tuned by use of at least one of:
  a bias mechanism resisting or urging movement of the at least one conductive member and/or at least one magnetic field relative to each other;
  a centrifugal input resisting or urging movement of the at least one conductive member and/or at least one magnetic field relative to each other;
  at least one mechanical driving mechanism driving the at least one conductive member or at least one magnetic field together.

14. The latching device as claimed in claim 1 wherein the at least one conductive member is at least one pawl with movement of the at least one conductive member constrained by:
  an axis of rotation;
  a line of translation; or
  a combination of an axis of rotation and a line of translation.

15. The latching device as claimed in claim 14 wherein the at least one pawl is orientated at an inclined plane relative to an orthogonal plane from the direction of motion of the pawl in the at least one magnetic field.

16. The latching device as claimed in claim 14 wherein the axis of rotation or line of translation is attached to the body member.

17. The latching device as claimed in claim 16 wherein the body member is a rotor and the at least one pawl is rotationally and pivotally mounted on the rotor, the rotor rotating about a rotor axis as the energizing force is applied.

18. The latching device as claimed in claim 17 wherein the at least one pawl is attached to the rotor at a point offset from the rotor axis.

19. The latching device as claimed in claim 18 wherein the body member is a slider and the at least one pawl is rotationally and pivotally mounted on the slider, the slider translates along a pathway as the energizing force is applied.

20. The latching device as claimed in claim 1 wherein at least part of a surface of the at least one conductive member or a part thereof interfaces with at least part of a surface of the at least one latch member or a part thereof.

21. The latching device as claimed in claim 20 wherein the surfaces frictionally engage.

22. The latching device as claimed in claim 20 wherein one or both surfaces are shaped to physically restrain the members on engagement.

23. The latching device as claimed in claim 1 wherein the at least one conductive member is retained in an engaged mode with the at least one latch member after the energizing force is removed.

24. The latching device as claimed in claim 1 wherein the at least one conductive member moves through a constrained path relative to the at least one magnetic field on application of an energizing force.

25. The latching device as claimed in claim 24 wherein the path is constrained by use of an aperture in the conductive member defining the range of movement and a stop that acts as a latch member that defines one or more distal points of movement.

26. A latching device comprising:
   at least one magnetic member;
   at least one conductor field;
   at least one latch member that, prior to latching, moves independently to the at least one magnetic member;
   a kinematic relationship between the at least one magnetic member and at least one conductor field that enables the at least one magnetic member to move at a different speed relative to the at least one conductor field on application of an energizing force, thereby inducing an eddy current drag force by relative movement of the at least one magnetic member in the at least one conductor field;
   wherein the eddy current drag force causes movement of the at least one magnetic member about a point or line causing at least part of the at least one magnetic member or a member therefrom to engage the at least one latch member thereby halting movement between the at least one magnetic member and the at least one latch member; and wherein either:
      the at least one magnetic member is attached to a body member that moves at least partially with the at least one magnetic member and, when the at least one magnetic member engages with the at least one latch member, movement of the body member stops relative to the at least one latch member; or
      the magnetic member is attached to a body member that is stationary and the latching member and conductor field move relative to the magnetic member and when the at least one magnetic member engages with the latch member, movement of the latch member stops relative to the body member.

27. The latching device as claimed in claim 26 wherein static or dynamic positional and/or strength adjustment of a point of action of the eddy current induced force is completed by adjusting the position of the magnetic element on the magnetic member as the magnetic member or conductor field moves.

28. The latching device as claimed in claim 26 wherein the at least one magnetic member is at least one pawl with movement of the at least one magnetic member constrained by:
   an axis of rotation;
   a line of translation; or
   a combination of an axis of rotation and a line of translation.

29. The latching device as claimed in claim 26 wherein at least part of a surface of the at least one magnetic member or a part thereof interfaces with at least part of a surface of the at least one latch member or a part thereof.

30. The latching device as claimed in claim 26 wherein the at least one magnetic member is retained in an engaged mode with the at least one latch member after the energizing force is removed.

31. The latching device as claimed in claim 26 wherein the at least one magnetic member moves through a constrained path relative to the at least one conductor field on application of an energizing force.

32. The latching device as claimed in claim 31 wherein the path is constrained by use of an aperture in the magnetic member defining the range of movement and a stop that acts as a latch member that defines one or more distal points of movement.

33. A line dispensing device incorporating at least one latching device as claimed in claim 26.

34. A passenger seat restraint incorporating at least one latching device as claimed in claim 26.

35. A vehicle incorporating at least one latching device as claimed in claim 26 to halt movement of the vehicle.

36. A zip line incorporating at least one latching device as claimed in claim 26.

37. A line dispensing device incorporating at least one latching device as claimed in claim 1.

38. A passenger seat restraint incorporating at least one latching device as claimed in claim 1.

39. A vehicle incorporating at least one latching device as claimed in claim 1 to halt movement of the vehicle.

40. A zip line incorporating at least one latching device as claimed in claim 1.

41. The latching device of claim 1 wherein the body member is a rotor.

42. The latching device of claim 41 wherein the eddy current drag force induces acceleration of the conductive member away from the rotor.

43. The latching device of claim 26 wherein the body member is a rotor.

44. The latching device of claim 43 wherein the eddy current drag force induces acceleration of the magnetic member away from the rotor.

\* \* \* \* \*